F. C. ROOT.
COMBINED FOOD COOKING UTENSIL AND TEA KETTLE.
APPLICATION FILED MAR. 1, 1915.
1,214,716.  Patented Feb. 6, 1917.
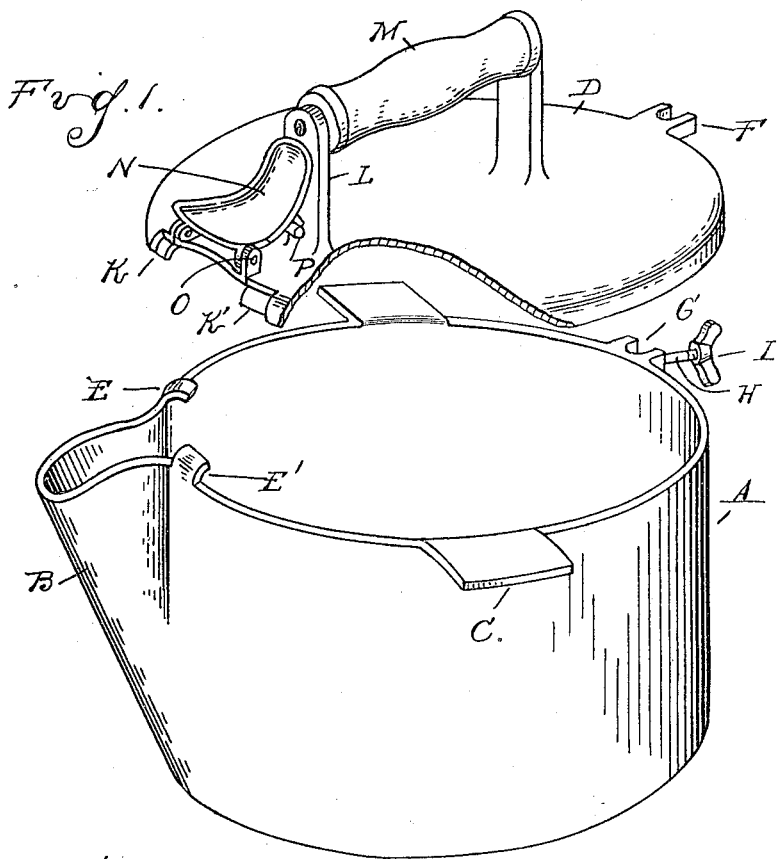
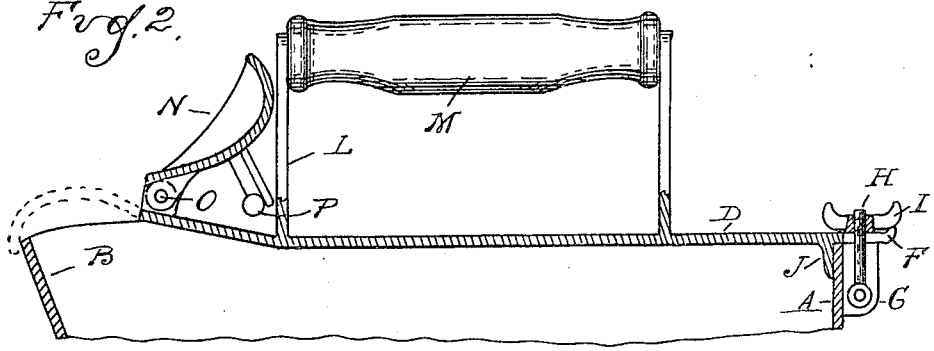
Inventor
Frank C. Root
Witnesses
By Whittemore Hulbert & Whittemore
Attorneys

UNITED STATES PATENT OFFICE.

FRANK C. ROOT, OF DETROIT, MICHIGAN.

COMBINED FOOD-COOKING UTENSIL AND TEA-KETTLE.

1,214,716.  Specification of Letters Patent.  Patented Feb. 6, 1917.

Application filed March 1, 1915.  Serial No. 11,165.

*To all whom it may concern:*

Be it known that I, FRANK C. ROOT, a citizen of the United States of America, residing at Detroit, in the county of Wayne and State of Michigan, have invented certain new and useful Improvements in Combined Food-Cooking Utensils and Tea-Kettles, of which the following is a specification, reference being had therein to the accompanying drawings.

The invention relates to cooking utensils and has for its object the obtaining of a construction which may be alternately used as a pot for cooking food and as the ordinary teakettle.

It is a further object to simplify and cheapen the cost of construction.

In the drawings: Figure 1 is a perspective view of the utensil showing the cover detached; and Fig. 2 is a cross section showing the cover clamped in position.

In the manufacture of the ordinary tea-kettles from cast metal the process of casting is somewhat complex, due to the fact that the opening for the cover is smaller than the maximum diameter of the body. Furthermore, the construction is not suitable for use in cooking food, due to the small size of the opening and the difficulty of properly cleansing the interior. Pots for boiling must be provided with covers, and difficulty is experienced in holding the covers in place while the boiling water is being poured off. I have therefore devised a construction in which the body of the pot is open at the top the full diameter, said body being provided with a cover for interlocking therewith to form a tightly closed vessel and being further provided with a pouring spout.

In detail, A is the body, preferably of substantially cylindrical form, slightly flaring toward the upper end so as to produce an easy form for casting.

B is a spout formed on one side of the body and also open at the top.

C are lugs upon opposite sides of the body which may be used as lifting handles.

D is a cover for fitting the upper edge of the body and having an interlocking engagement therewith. This interlocking engagement is preferably formed by inturned lugs or flanges E E′ upon the body portion and preferably upon opposite sides of the spout B; also a rearwardly-extending bifurcated lug F on the cover registering with lugs G upon the body and adapted to be clamped thereto by a clamping bolt H pivotally attached to the lugs G, and having a wing nut I for engaging the lugs F. There is provided a depending lug J on the cover adjacent to the lug F and fitting within the body to hold the cover in engagement with the inwardly-turned lugs E. The cover is recessed at K and K′ to receive the lugs E and E′, so as to form a flush joint at the top.

L are upwardly-extending lugs on the cover to which is connected a handle M.

N is a nose or spout cover preferably hinged at O to the cover D and having the weighted lug P for holding in either open or closed position.

In use, if the device is to be used as the ordinary teakettle, the cover D is locked in position by first engaging the lugs E E′ with the recesses K K′, and then clamping the lug F upon the lugs G by the bolt H and wing nut I. The pot may be filled through the nose or spout by turning back the hinged lid N, and the lug P will then hold this lid in open or closed position as desired. Where the device is to be used for boiling vegetables or for other food cooking operations, the cover may be quickly detached for the placing in of food and then replaced and locked in position. If it is desired to pour off the boiling water this may be readily accomplished without danger of emptying out the solid contents or burning the operator with escaping steam. The handle M forms a convenient means for lifting the pot and tilting same for pouring, and at the same time the pot may be quickly opened by the complete removal of the cover.

What I claim as my invention is:—

1. A utensil, comprising a body having a full opening at the top, and further provided with a spout or nose open at the top, lifting lugs upon opposite sides of said body, inwardly-extending lugs upon opposite sides of the nose or spout, a cover for closing said top recessed to receive said inwardly-extending lugs, a clamp for securing the rear edge of said cover to said body, a hinged spout lid or cover, and means for holding said spout cover alternatively in open or closed position.

2. A utensil, comprising a body having a full open top and an open-top pouring spout, lugs projecting inwardly from said body at opposite sides of the spout, a cover for said body formed with recesses to receive said lugs and cut-away between said recesses, a lid for the spout mounted upon the cover adjacent said cut-away portion, said lid and said lugs being flush with the cover when the latter is applied to the utensil, and means for engaging the cover with the body at a point substantially diametrically opposite the spout.

3. A utensil, comprising a body having a full open top and an open-top nose or spout, a cover detachably engaged with said body, a lid for said spout pivotally carried by the cover, a handle on said cover arranged longitudinally with respect to the plane of the spout, and forming a lifting and pouring handle for the whole utensil, and a handle for the spout lid, said spout lid being pivotally movable to and from the main handle, whereby the hand grasping the main handle may actuate the spout lid.

In testimony whereof I affix my signature in presence of two witnesses.

FRANK C. ROOT.

Witnesses:
JAMES P. BARRY,
HENRIETTA E. BOWMAN.

Copies of this patent may be obtained for five cents each, by addressing the "Commissioner of Patents, Washington, D. C."